UNITED STATES PATENT OFFICE.

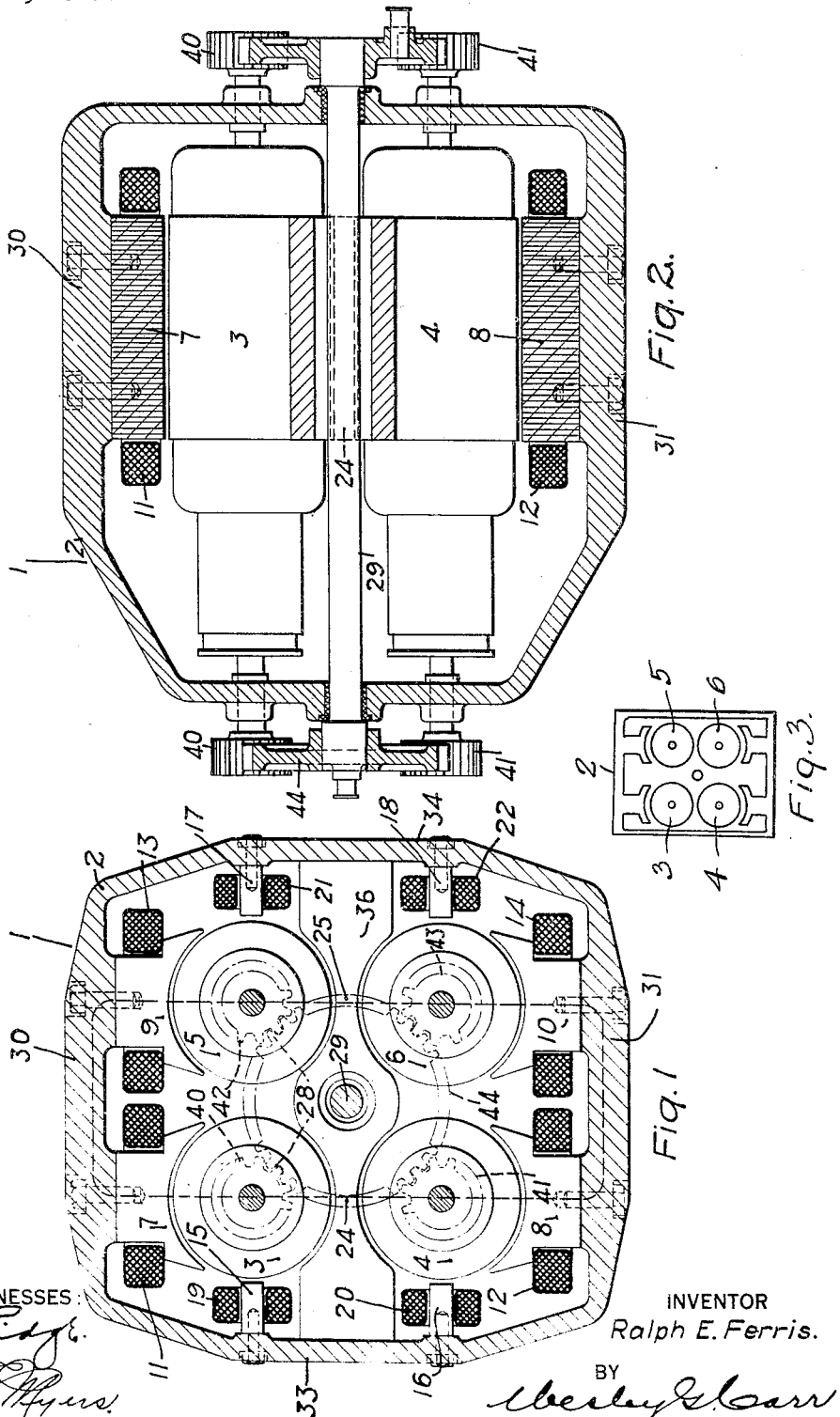

RALPH E. FERRIS, OF SWISSVALE, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,292,592.  Specification of Letters Patent.  Patented Jan. 28, 1919.

Application filed September 9, 1915. Serial No. 49,736.

*To all whom it may concern:*

Be it known that I, RALPH E. FERRIS, a citizen of the United States, and a resident of Swissvale, in the county of Allegheny and State of Pennsylvania, have invented a new and useful Improvement in Dynamo-Electric Machines, of which the following is a specification.

My invention relates to dynamo-electric machines, and it has special reference to multi-armature driving motors of the bipolar type that are particularly adapted for service upon high-voltage direct-current railway systems.

One of the objects of my invention is to provide a device of the above-indicated character which shall be particularly simple and compact in arrangement and light and durable in construction, and which shall embody four armatures that are contained within a single inclosing magnetizable frame to provide a single magnetic circuit which serves all of the armatures in common.

Another object of my invention is to provide a high-voltage driving unit of the class referred to, in which the armatures shall be disposed in close proximity, although separated by suitable air gaps, and in which the only field-magnet windings provided are associated with polar projections that project inwardly from the opposite ends of the frame into electro-magnetic relation with the respective armatures.

In Patent No. 1,252,052, issued on Jan. 1, 1918, to the Westinghouse Electric & Manufacturing Company on an application filed by N. W. Storer, is shown and disclosed a four-armature unitary driving machine which comprises two twin motors that are rigidly secured together to constitute a single unit and to provide a single main magnetic path for all four of the armatures. In this structure, however, each armature is provided with two polar projections having field-magnet windings associated therewith, so that, when the twin motors are assembled as a single unit, the armatures of the respective motors are separated by the interposed portions of the field-magnet frame as well as by the intermediate polar projections and field-magnet windings. Thus, a relatively long magnetic path is provided which necessitates the use of unnecessary magnetic material and provides a bulky, heavy and expensive structure.

According to my invention, I provide a multi-armature unit of the above-mentioned character, and, in order to overcome the objections incident to prior structures, I propose to omit the customary intermediate polar projections and field-magnet windings and to locate the armatures of the several pairs relatively near to one another, and, in certain instances, to provide consequent poles intermediate the armatures of each pair for the purpose of facilitating the passage of flux between said armatures and preventing its leakage across the gaps which separate the armatures of the different pairs. Moreover, I provide a single commutating polar projection and field-magnet winding for each of the armatures for the purpose of improving the commutating conditions and insuring an efficient and smooth operation.

In the accompanying drawing, Figure 1 is a view, partially in section and partially in end elevation, of a dynamo-electric machine constructed in accordance with my invention; Fig. 2 is a view, partially in section and partially in side elevation, of the driving-unit shown in Fig. 1, and Fig. 3 is a sectional view of a modification of the device shown in Fig. 1.

Referring to the drawing, a dynamo-electric machine 1 comprises a substantially rectangular inclosing magnetic frame 2, a plurality of armatures 3, 4, 5 and 6 that are disposed in pairs, a plurality of main polar projections 7, 8, 9, and 10 that are associated with the respective armatures, a plurality of main field-magnet windings 11, 12, 13 and 14 disposed thereon, a plurality of commutating polar projections 15, 16, 17 and 18, a plurality of commutating field-magnet windings 19, 20, 21 and 22 disposed thereon, a plurality of consequent poles 24 and 25 that are respectively interposed between the armatures 3 and 4 and 5 and 6, and gearing 28, or other mechanical means, for connecting the several armatures to a common centrally located driving shaft 29.

The field-magnet frame 2 is adapted to entirely inclose the several armatures and to carry the same in suitable bearings in any familiar manner. The frame 2 is provided with upper and lower portions 30 and 31 of relatively large cross-sectional area for the purpose of carrying the main magnetic flux between the two main polar projections 7 and 9 that are secured to the upper portion 30 and the polar projections 8 and 10 that are associated with the lower frame portion 31. The commutating polar projections 15, 16, 17 and 18 are suitably secured to end portions 33 and 34 of the frame 2 and said portions are of only sufficient cross-sectional area to meet the requirements of strength and rigidity, inasmuch as these portions of the frame are required to carry only a relatively small commutating flux.

The armatures 3 and 4 are disposed, one above the other, between the correspondingly located main polar projections 7 and 8, and the consequent pole 24 of magnetizable material is interposed between their adjacent surfaces in order to assist in carrying the flux between them.

Similarly, the armatures 5 and 6 are separated by the consequent pole 25 of magnetizable material and are disposed between the main polar projections 9 and 10.

The consequent poles 24 and 25 conveniently form parts of a single member 36 which may be suitably positioned between the side portions 33 and 34 of the frame 2, although said consequent poles may, if desired, constitute integral portions of the frame 2 or may be positioned in any other suitable manner, it being important only that members of magnetizable material be located intermediate the armatures of the several pairs in order to facilitate the passage of flux between said armatures and prevent leakage across the gaps, intermediate the armatures of the several pairs.

In some instances, it may be found desirable to omit the consequent poles altogether and to arrange the several armatures as shown in Fig. 3 in order to prevent excessive flux leakage, such as referred to.

The several armatures 3, 4, 5 and 6 are respectively mechanically interconnected by means of the gearing 28 which comprises pinions 40, 41, 42 and 43 that are associated with the respective armatures and engage a coöperating gear wheel 44 that is rigidly connected to the central counter-shaft 29.

By reason of the arrangement of parts shown and described, a single main magnetic circuit, shown in dotted lines, serves in common for all of the armatures, the flux path is exceedingly short, and, moreover, the unitary driving motor thus provided is particularly compact in arrangement and, therefore, is correspondingly light and inexpensive in construction.

Many modifications in the arrangement and location of parts and in the specific structural details thereof may be effected without departing from the spirit and scope of my invention, and I aim to cover such modifications in the appended claims.

I claim as my invention:

1. A dynamo-electric machine comprising a field-magnet frame, polar projections and field-magnet windings associated with said frame, and two pairs of armatures disposed within said frame and in operative relation to said polar projections, said armatures being disposed in proximity without the interposition of field-magnet windings.

2. A dynamo-electric machine comprising a field-magnet frame, two pairs of armatures disposed within said frame and respectively spaced apart by an air gap, a consequent pole of magnetizable material interposed between the armatures of each pair, and polar projections and corresponding field-magnet windings positioned at opposite sides of said frame and disposed at the ends of said pairs of armatures, whereby a single main magnetic circuit serves all of said armatures.

3. A dynamo-electric machine comprising a field-magnet frame, two pairs of armatures disposed within said frame and respectively spaced apart by an air gap, and polar projections and associated field-magnet windings carried by the respective ends of said frame and severally disposed at the ends of the respective pairs of armatures, whereby a single main magnetic circuit through all of the armatures is provided.

4. A dynamo-electric machine comprising a field-magnet frame, a pair of inwardly projecting polar projections and field-magnet windings therefor associated with opposite ends of said frame, and two pairs of armatures disposed within said frame and respectively located between the corresponding end polar projections to constitute magnetic paths between said corresponding projections, said pairs of armatures being solely separated by an air-gap.

5. In a dynamo-electric machine, the combination with a field-magnet frame, two inwardly projecting polar members and field-magnet windings therefor associated with each of the opposite ends of said frame, and four armatures disposed within said frame and severally positioned adjacent to said polar members, of magnetizable polar members interposed between the armatures associated with the corresponding and oppositely located polar members, and commutating polar members and field-magnet windings therefor associated with the opposite sides of said frame and severally positioned adjacent to said armatures.

6. In a dynamo-electric machine, the combination with a rectangular inclosed magnetizable frame, a pair of polar members projecting inwardly from the opposite ends thereof, and magnetizing windings disposed around said members, of four armatures disposed in pairs between the corresponding oppositely located polar members and without magnetizing windings interposed between the armatures of each pair, and a centrally located counter-shaft mechanically associated with all of said armatures.

7. A dynamo-electric machine comprising a field-magnet frame, four polar members associated in pairs with opposite ends thereof, magnetizing windings carried thereby, and four armatures disposed within said frame and severally positioned adjacent to the respective polar members to provide a single main magnetic circuit through all of said armatures, said polar members, and portions of the opposite ends of said frame, the pairs of armatures being separated solely by an air-gap.

In testimony whereof, I have hereunto subscribed my name this 27th day of Aug., 1915.

RALPH E. FERRIS.